United States Patent
Zhou et al.

(10) Patent No.: US 12,207,270 B2
(45) Date of Patent: Jan. 21, 2025

(54) TCI STATE APPLICATION TIME CONFIGURATION

(71) Applicant: QUALCOMM Incorporated, San Diego, CA (US)

(72) Inventors: Yan Zhou, San Diego, CA (US); Tianyang Bai, Somerville, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 545 days.

(21) Appl. No.: 17/544,552

(22) Filed: Dec. 7, 2021

(65) Prior Publication Data

US 2022/0217751 A1     Jul. 7, 2022

Related U.S. Application Data

(60) Provisional application No. 63/133,726, filed on Jan. 4, 2021.

(51) Int. Cl.
*H04L 5/00* (2006.01)
*H04W 72/23* (2023.01)
*H04W 72/51* (2023.01)
*H04L 27/26* (2006.01)

(52) U.S. Cl.
CPC .......... *H04W 72/23* (2023.01); *H04L 5/0048* (2013.01); *H04W 72/51* (2023.01); *H04L 27/26025* (2021.01)

(58) Field of Classification Search
None
See application file for complete search history.

(56) References Cited

U.S. PATENT DOCUMENTS

| | | | |
|---|---|---|---|
| 2021/0160881 A1* | 5/2021 | Rahman | H04W 72/0446 |
| 2021/0368453 A1* | 11/2021 | Lee | H04W 52/146 |
| 2021/0385807 A1* | 12/2021 | Rahman | H04B 7/06968 |
| 2022/0039129 A1* | 2/2022 | Takeda | H04W 72/1273 |
| 2022/0210781 A1* | 6/2022 | Farag | H04W 72/542 |
| 2022/0225370 A1* | 7/2022 | Park | H04L 5/001 |
| 2023/0027281 A1* | 1/2023 | Sun | H04W 72/0453 |
| 2023/0247618 A1* | 8/2023 | Yuan | H04L 5/0023 370/328 |
| 2023/0269041 A1* | 8/2023 | Rong | H04L 5/0053 370/329 |
| 2024/0014880 A1* | 1/2024 | Svedman | H04B 7/06968 |

* cited by examiner

*Primary Examiner* — Abdelillah Elmejjarmi
(74) *Attorney, Agent, or Firm* — Patterson + Sheridan, L.L.P.

(57) ABSTRACT

Certain aspects of the present disclosure provide techniques for configuring a transmission configuration indicator (TCI) state application time for at least one common multi-channel TCI state. A method that may be performed by a user equipment (UE) includes receiving a TCI state indication from a network, wherein the TCI state indication comprises at least one common multi-channel TCI state, and configuring a TCI state application time for the at least one common multi-channel TCI state based on one or more factors.

30 Claims, 10 Drawing Sheets

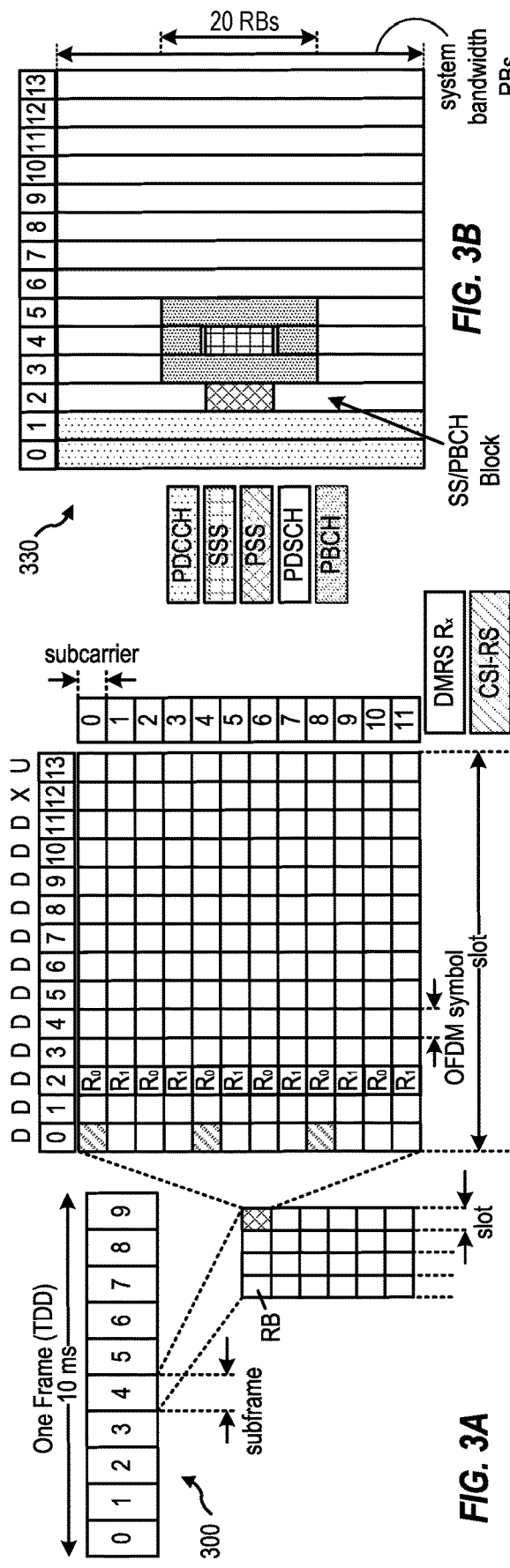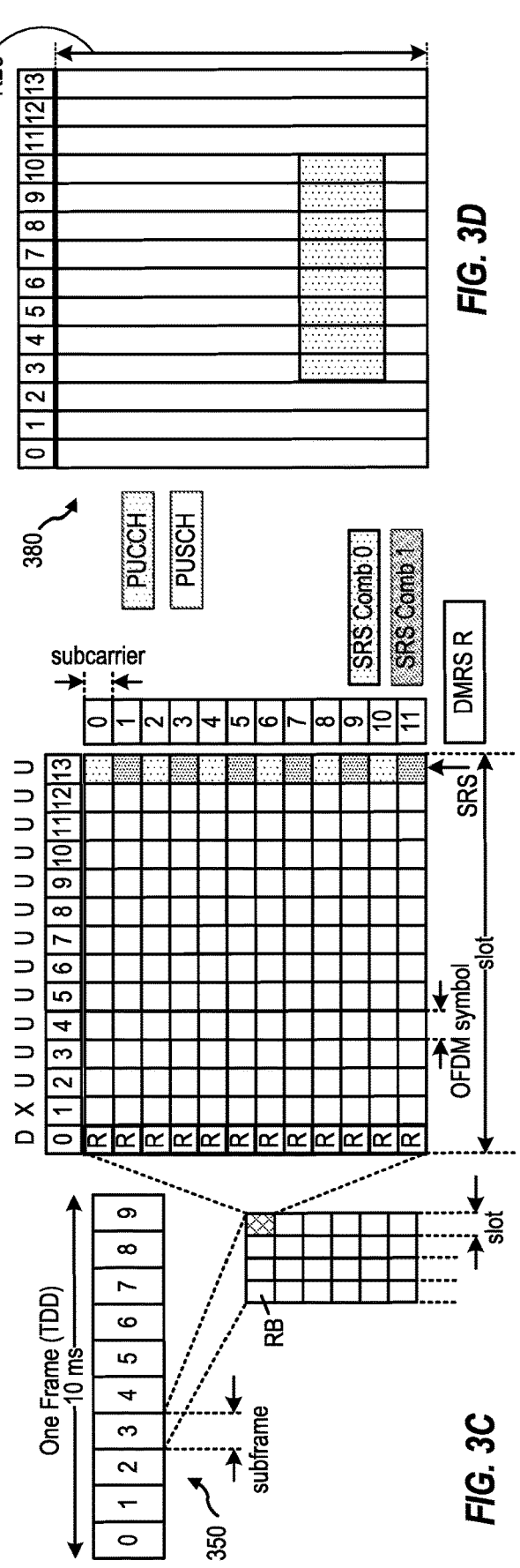

400B

```
┌─────────────────────────────────────────────┐
│ A METHOD BY A BASE STATION (BS) FOR         │
│ CONFIGURING A TCI STATE APPLICATION TIME    │
│ FOR AT LEAST ONE COMMON MULTI-CHANNEL       │
│ TCI STATE                                   │
└─────────────────────────────────────────────┘
                     │
                     ▼                      ┌─ 404A
┌─────────────────────────────────────────────┐
│ TRANSMITTING A TRANSMISSION CONFIGURATION   │
│ INDICATOR(TCI) STATE INDICATION TO A USER   │
│ EQUIPMENT (UE), WHEREIN THE TCI STATE       │
│ INDICATION COMPRISES AT LEAST ONE COMMON    │
│ MULTI-CHANNEL TCI STATE                     │
└─────────────────────────────────────────────┘
                     │
                     ▼                      ┌─ 404B
┌─────────────────────────────────────────────┐
│ CONFIGURING A TCI STATE APPLICATION TIME    │
│ FOR THE AT LEAST ONE COMMON MULTI-CHANNEL   │
│ TCI STATE BASED ON ONE OR MORE FACTORS      │
└─────────────────────────────────────────────┘
                     │
                     ▼                      ┌─ 406B
┌─────────────────────────────────────────────┐
│ COMMUNICATING WITH THE UE USING THE AT      │
│ LEAST ONE COMMON MULTI-CHANNEL TCI STATE    │
│ BASED ON THE CONFIGURED APPLICATION TIME    │
└─────────────────────────────────────────────┘
```

*FIG. 4B*

TCI STATE APPLICATION TIME CONFIGURATION

CROSS-REFERENCE TO RELATED APPLICATIONS

This application claims benefit of and priority to U.S. Provisional Application No. 63/133,726, filed Jan. 4, 2021, which is hereby assigned to the assignee hereof and hereby expressly incorporated by reference herein in its entirety as if fully set forth below and for all applicable purposes.

INTRODUCTION

Field of the Disclosure

Aspects of the present disclosure relate to wireless communications, and more particularly, to techniques for configuring a transmission configuration indicator (TCI) state application time for at least one common multi-channel TCI state.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These and other multiple access technologies have been adopted in various telecommunication standards to provide a common protocol that enables different wireless devices to communicate on a municipal, national, regional, and even global level. However, as the demand for mobile broadband access continues to increase, there exists a need for further improvements in these and emerging wireless communications technologies.

SUMMARY

Certain aspects can be implemented in a method for wireless communication by a user equipment (UE). The method generally includes receiving a transmission configuration indicator (TCI) state indication from a network, wherein the TCI state indication comprises at least one common multi-channel TCI state and configuring a TCI state application time for the at least one common multi-channel TCI state based on one or more factors.

Certain aspects can be implemented in a method for wireless communication by a base station (BS). The method generally includes transmitting a transmission configuration indicator (TCI) state indication to a user equipment (UE), wherein the TCI state indication comprises at least one common multi-channel TCI state and configuring a TCI state application time for the at least one common multi-channel TCI state based on one or more factors.

Other aspects provide apparatuses configured to perform the aforementioned methods as well as those described herein; non-transitory, computer-readable media comprising instructions that, when executed by one or more processors, cause the one or more processors to perform the aforementioned methods as well as those described herein; a computer program product embodied on a computer readable storage medium comprising code for performing the aforementioned methods as well as those further described herein; and an apparatus comprising means for performing the aforementioned methods as well as those further described herein.

The following description and the appended drawings set forth in detail certain illustrative features of the one or more aspects. These features are indicative, however, of only a few of the various ways in which the principles of various aspects may be employed.

BRIEF DESCRIPTION OF THE FIGURES

The appended figures depict certain features of the various aspects described herein and are not to be considered limiting of the scope of this disclosure.

FIGS. 3A, 3B, 3C, and 3D depict various example aspects of data structures for a wireless communication network.

FIG. 4B is a flow diagram illustrating example operations for wireless communication by a base station (BS), in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide systems and methods for configuring a transmission configuration indicator (TCI) state application time for at least one common multi-channel TCI state.

For example, recently, a unified TCI framework was introduced in 5G Release 17 that included three common multi-channel TCI state types, including a joint DL/UL common TCI state to indicate a common beam for at least one DL channel and/or RS and at least one UL channel and/or reference signal (RS), a separate DL common TCI state to indicate a common beam for at least two DL channels and/or RSs, and a separate UL common TCI state to indicate a common beam for at least two UL channels and/or RSs. When configured with at least one of these common multi-channel TCI state types, a user equipment (UE) may begin communicating with a network according to the configured common multi-channel TCI state type after a particular application time. In some cases, because the common multi-channel TCI states may be applied to multiple channels or RSs, the application time associated with these common multi-channel TCI states may depend on various factors, such as UE capabilities, target channels and RSs, source RSs, and the like. In some cases, proper TCI state application configuration may be necessary to avoid issues with communication between the network and the UE (e.g., beam misalignment). Thus, aspects of the present disclosure provide techniques for configuring a TCI state application time for at least one common multi-channel TCI state to avoid these issues.

Introduction to Wireless Communication Networks

Figure 1:
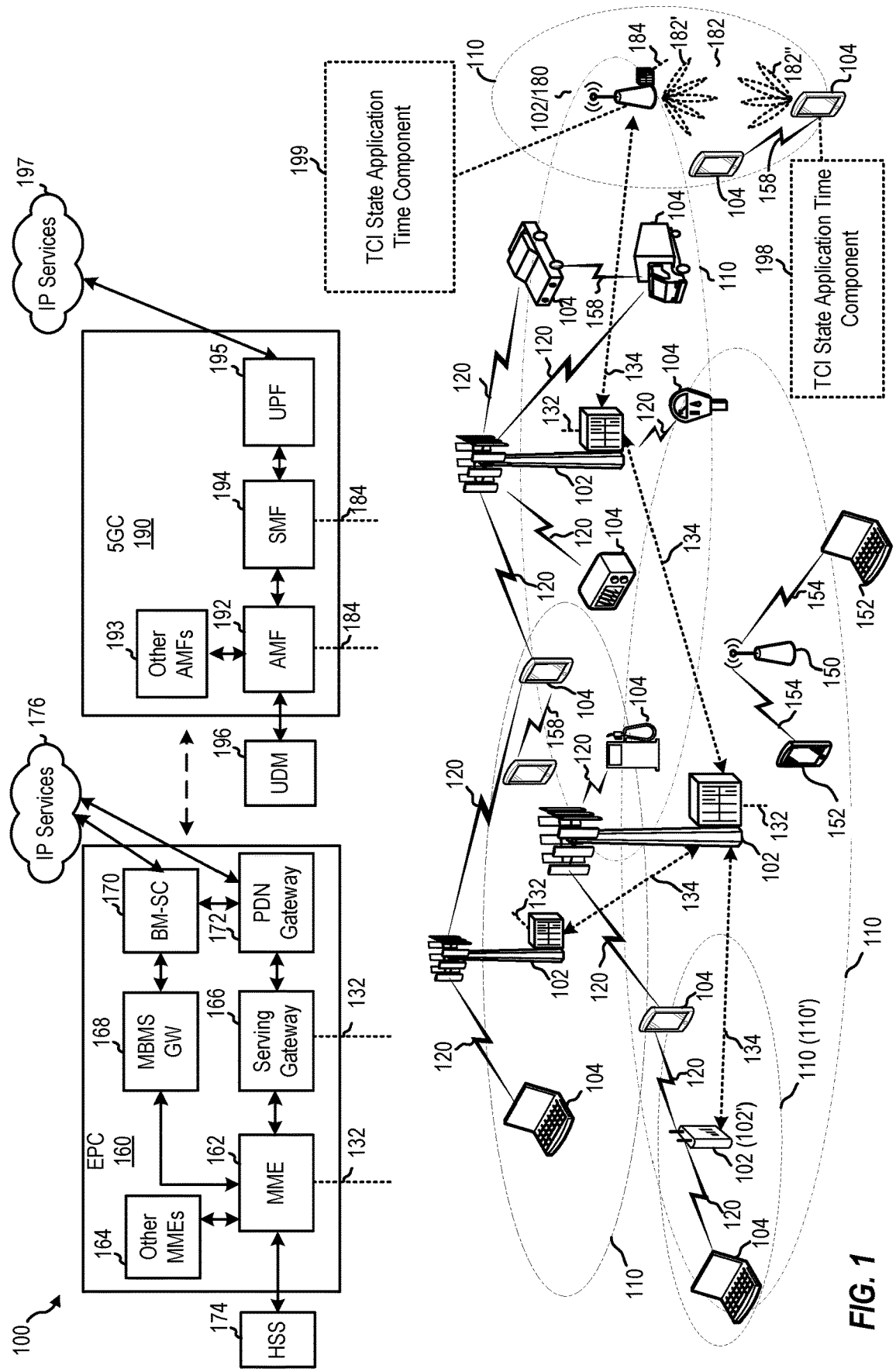
FIG. 1 is a block diagram conceptually illustrating an example wireless communication network, in accordance with certain aspects of the present disclosure.

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., BS 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Figure 4A:
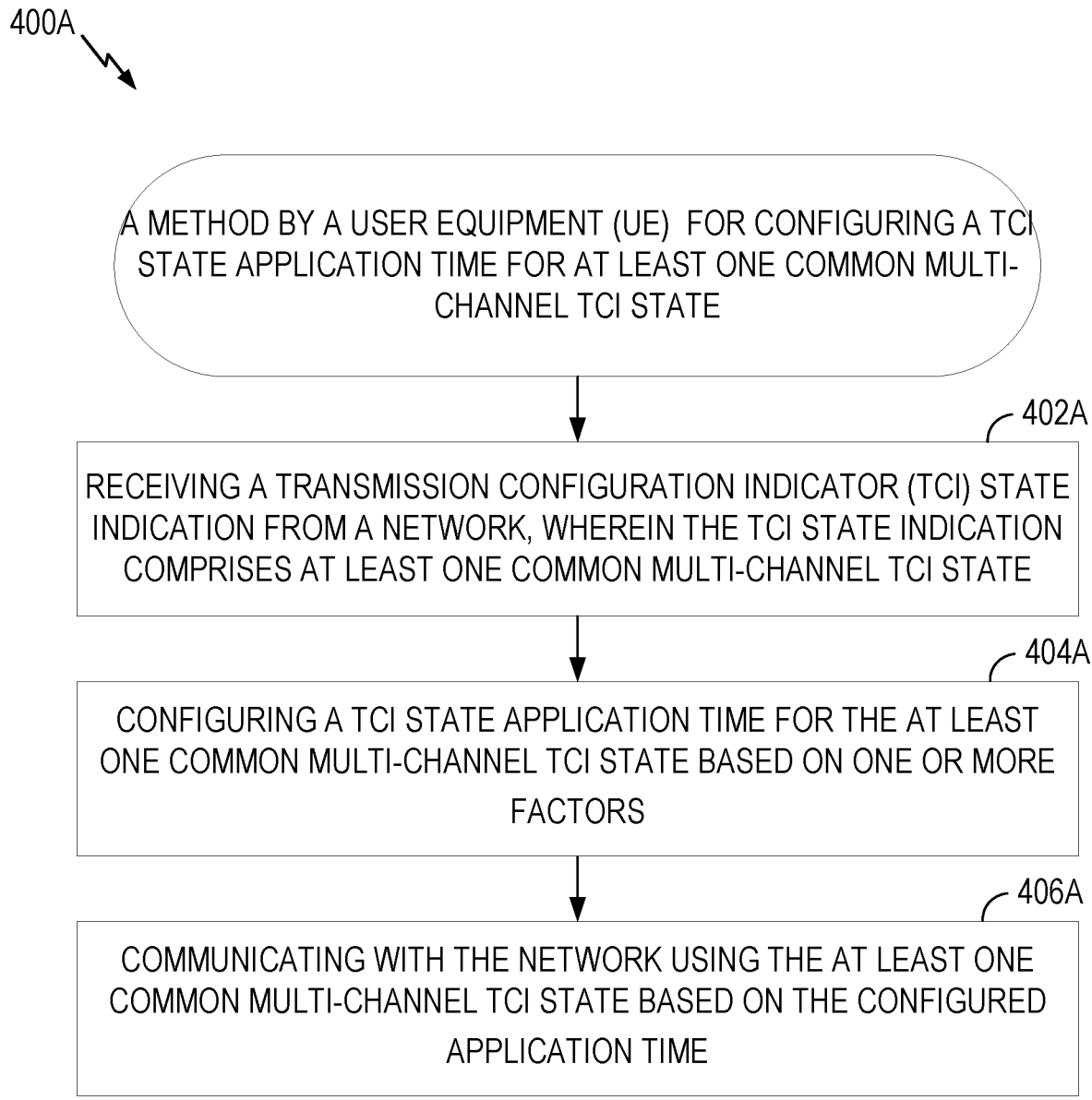
FIG. 4A is a flow diagram illustrating example operations for wireless communication by a user equipment (UE), in accordance with certain aspects of the present disclosure.
Figure 5:
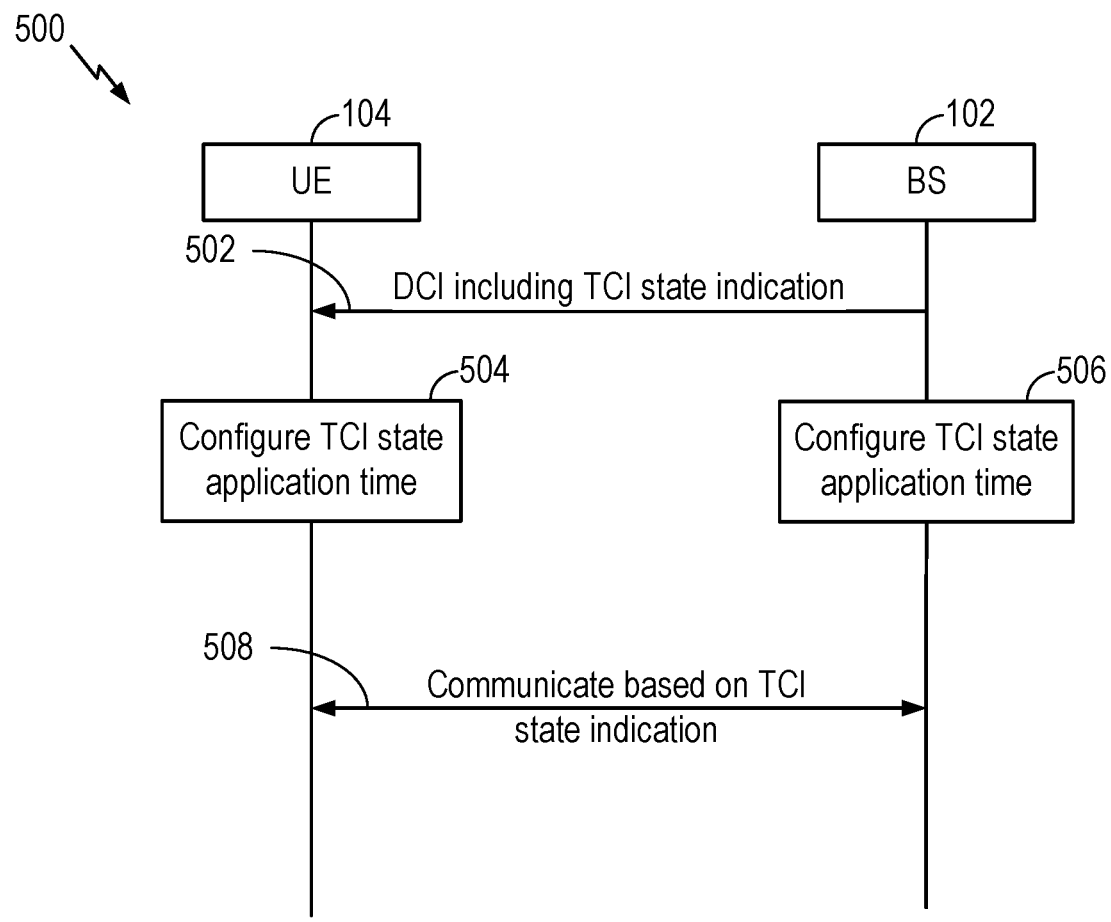
FIG. 5 is an example call flow diagram illustrating example operations for wireless communication between the UE and the BS, in accordance with certain aspects of the present disclosure.

In some cases, BS 102 in the wireless communication network 100 may include a TCI state application time component 199, which may be configured to perform the operations depicted and described with respect to FIGS. 4B and 5, as well as other operations described herein for configuring a TCI state application time for at least one common multi-channel TCI state. Additionally, a UE 104 in the wireless communication network 100 may include a TCI state application time component 198, which may be configured to perform the operations depicted and described with respect to FIGS. 4A and 5, as well as other operations described herein for configuring a TCI state application time for at least one common multi-channel TCI state.

Figure 2:
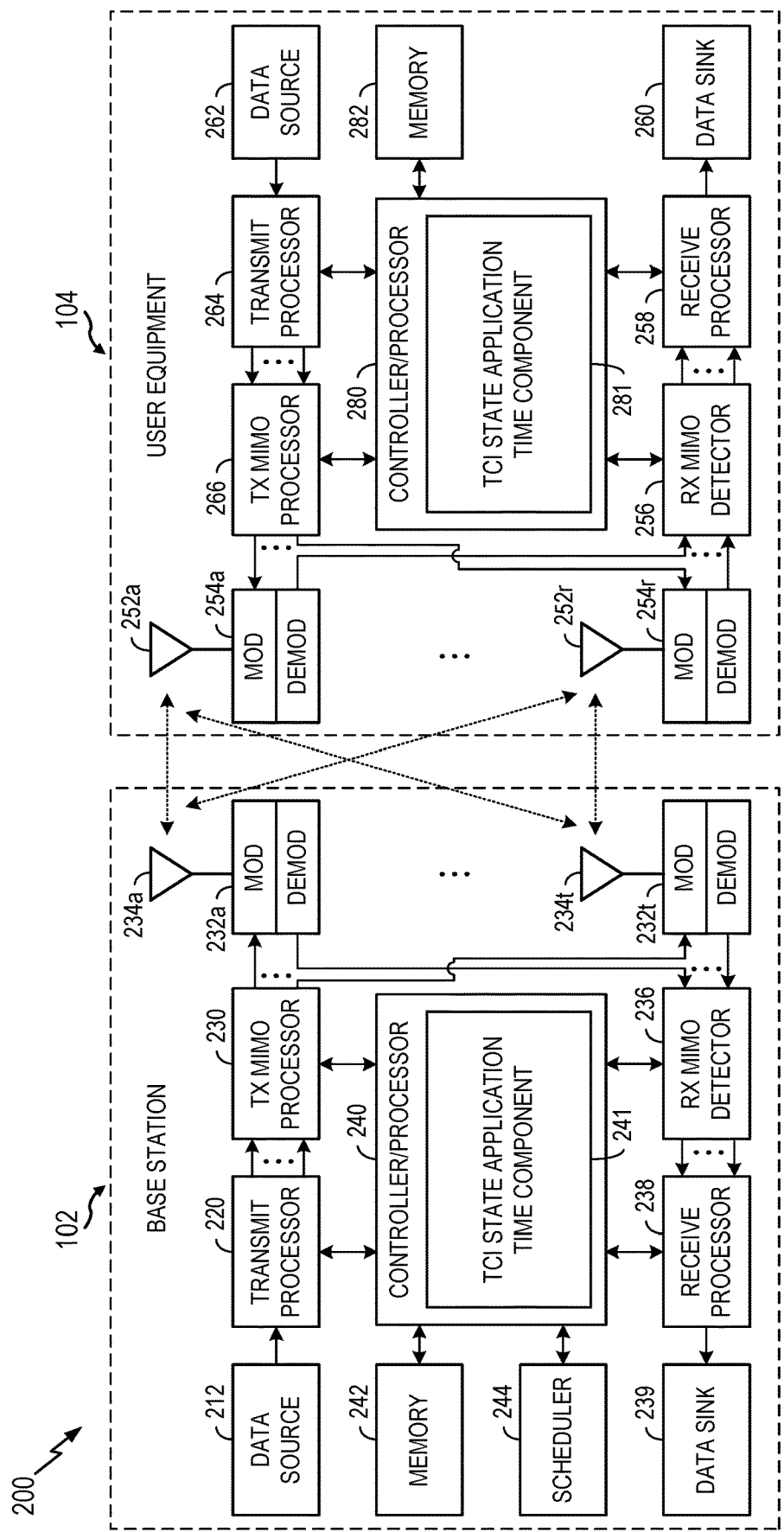
FIG. 2 is a block diagram conceptually illustrating aspects of an example base station (BS) and user equipment (UE), in accordance with certain aspects of the present disclosure.

FIG. 2 depicts aspects of an example BS 102 and a UE 104. Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes TCI state application time component 241, which may be representative of TCI state application time component 199 of FIG. 1. Notably, while depicted as an aspect of controller/processor 240, TCI state application time component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes TCI state application time component 281, which may be representative of TCI state application time component 198 of FIG. 1. Notably, while depicted as an aspect of controller/processor 280, TCI state application time component 281 may be implemented additionally or alternatively in various other aspects of UE 104 in other implementations.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., BS 180) configured to communicate using mmWave/near mmWave radio frequency bands may utilize beamforming (e.g., 182) with a UE (e.g., 104) to improve path loss and range.

Example Application Time Configuration for Common TCI States

In certain networks, such as fifth generation (5G) New Radio (NR) network, a user equipment (UE) may communicate with the network via one or more cells (e.g., one or more serving cells) and using one or more component carriers (or carrier bandwidths). In 5G, each component carrier may be defined by one or more bandwidth parts (BWPs). In some cases, a bandwidth part may be considered as a contiguous set of physical resource blocks, selected from a contiguous subset of the common resource blocks for a given numerology on a given carrier. In some cases, the UE may be configured with a maximum of four BWPs in the downlink (DL) and uplink (UL) for a given carrier.

Additionally, in certain cases, only one BWP for the given carrier may be active at any given time. For example, assuming that the UE is configured with four BWPs (BWP0, BWP1, BWP2, and BWP3), only one of the four BWPs may be active at a given time while the other BWPs remain inactive. However, while only one BWP may be active at a time, the active BWP may be switched to a different BWP. For example, assuming BWP1 is the active BWP, the active BWP may be switched to BWP2 or BWP3 based on certain criteria.

In some cases, the UE may be configured with a set of beam indication sets for communicating in one or more BWPs. For uplink transmission, the beam indication sets may be spatial relations. For downlink transmission, the beam indication sets may be transmission configuration indicator (TCI) states. The set of beam indications may be configured for a particular channel or type of transmission. The UE may be configured with the beam indication sets by higher layer signaling, such as radio resource control (RRC) signaling. In some examples, a subset of the configured sets may be activated via a medium access control element (MAC-CE). In some examples, an indication in downlink control information (DCI) may indicate (e.g., via a 3-bit indicator) one of the beam indications for the transmission scheduled by the DCI. The indicated TCI state or spatial relation may indicate to the UE the receive beam or transmit beam to use, respectively.

Different TCI beam indication types (or TCI state types) may exist. For example, in some cases, the TCI beam indication types may include several single-channel beam indication types, such as (1) a separate DL single channel and/or RS TCI state to indicate a beam for a single DL channel and/or RS, (2) a separate UL single channel and/or RS TCI state to indicate a beam for a single UL channel and/or RS, and (3) UL spatial relation info to indicate a beam for a single UL channel and/or RS. Additionally, in some cases, the TCI beam indication types may include three additional multi-channel beam indication types, including (4) a joint DL/UL common TCI state to indicate a common beam for at least one DL channel and/or RS and at least one UL channel and/or RS, (5) a separate DL common TCI state to indicate a common beam for at least two DL channels and/or RSs, and (6) a separate UL common TCI state to indicate a common beam for at least two UL channels and/or RSs. Generally, these beam indication types/TCI states may be updated by downlink control information (DCI) from a base station in a network. When updated, an application time associated with the updated beam indication type/TCI state may be determined. The application time may specify a time after which the UE may apply the updated TCI state when communicating with the base station.

In some cases, the common multi-channel TCI states (e.g., TCI state types 4, 5, and 6) may be applied to multiple channels or reference signals (RSs). As such, the application time associated with these common multi-channel TCI states may depend on various factors. For example, in some cases, the application time may be different across applied target channels and/or RSs due to different firmware and/or hardware units. For example, in some cases, the application time can be different for PDSCH and PUSCH due to separate Rx/Tx units, and the application time can further depend on UE capability per target channel and/or RS. Additionally, in some cases, the application time may be longer if the DCI and the applied channel and/or RS are processed on different antenna panels of the UE due to additional panel switching latency.

Further, in some cases, the application time may be longer if a quasi-collocated (QCL'ed) source RS of a beam indication in the TCI state is from non-serving neighbor cell due to potential additional warm-up period (e.g., for antennas, panels, TX or RX hardware, and the like) for the non-serving RS measurement, and may be different for DL and UL RS as the QCL source RS. Additionally, in some cases, the beam application time may be longer if the beam indication is applied to multiple component carriers (CCs) simultaneously due to potential additional processing time. Additionally, in some cases, the application time may be longer if the numerology for scheduling DCI and/or applied channel(s) and/or RS(s) is smaller, or equivalently the subcarrier spacing (SCS) of the CC for scheduling DCI and/or applied channel(s) and/or RS(s) is larger.

Thus, aspects of the present disclosure provide techniques for determining an application time associated with at least a common multi-channel TCI state. For example, such techniques may involve receiving a TCI state indication from a network, the TCI state indication comprising at least one common multi-channel TCI state, and configuring a TCI state application time for the at least one common multi-channel TCI state based on one or more factors. Thereafter, the UE may communicate with the network using the at least one common multi-channel TCI state based on the configured application time.

Example Operations for Configuring a TCI State
Application Time for at Least One Common
Multi-Channel TCI State FIG. 4A is a flow diagram illustrating example operations 400A for wireless communication, in accordance with certain aspects of the present disclosure. The operations 400 may be performed, for example, by a UE (e.g., such as the UE 104 illustrated in FIGS. 1 and 2) for configuring a TCI state application time for at least one common multi-channel TCI state. The operations 400A may be implemented as software components that are executed and run on one or more processors (e.g., controller/processor 280 of FIG. 2). Further, the transmission and reception of signals by the UE in operations 400A may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400A begin, at 402A, by receiving a TCI state indication from a network. In some aspects, the TCI state indication comprises at least one common multi-channel TCI state.

At block 404A, the UE configures a TCI state application time for the at least one common multi-channel TCI state based on one or more factors.

Additionally, at block 406A, the UE optionally communicates with the network using the indicated TCI state. In some aspects, the UE communicates using the at least one common multi-channel TCI state based on the configured application time. For example, the UE may wait for a duration of the configured TCI state application time prior to communicating based on the TCI state indicated by the network.

FIG. 4B is a flow diagram illustrating example operations 400B for wireless communication, in accordance with certain aspects of the present disclosure. The operations 400B may be performed, for example, by a BS (e.g., such as the BS 102 illustrated in FIGS. 1 and 2) for configuring a TCI state application time for at least one common multi-channel TCI state. The operations 400B may be complementary to the operations 400A performed by the UE. The operations 400B may be implemented as software components that are executed and run on one or more processors (e.g., controller/processor 240 of FIG. 2). Further, the transmission and reception of signals by the BS in operations 400B may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 400B begin, at 402B, by transmitting a TCI state indication to a UE. In some aspects, the TCI state indication comprises at least one common multi-channel TCI state.

At block 404B, the BS configures a TCI state application time for the at least one common multi-channel TCI state based on one or more factors.

Additionally, at block 406B, the BS optionally communicates with the UE using the indicated TCI state. In some aspects, the BS communicates using the at least one common multi-channel TCI state based on the configured application time.

Example Call Flow Illustrating Example Operations Between a Base Station and User Equipment for Configuring a TCI State Application Time FIG. 5 is an example call flow diagram illustrating operations performed by a UE (e.g., such as the UE 104 illustrated in FIGS. 1 and 2) and a BS (e.g., such as the BS 102 illustrated in FIGS. 1 and 2) for configuring a TCI state application time for at least one common multi-channel TCI state.

For example, as shown at 502, the BS 102 transmits a TCI state indication to the UE 104 that comprises at least one common multi-channel TCI state.

At block 504, the UE 104 configures a TCI state application time for the at least one common multi-channel TCI state based on one or more factors, as discussed in more detail below.

As shown in block 506, the BS 102 also configures the TCI state application time for the at least one common multi-channel TCI state based on the one or more factors. In some cases, the BS may configure the TCI state application time based on a UE capability enquiry. For example, in some cases, the BS may transmit a UE capability enquiry, requesting the UE to provide capability information related to a TCI state application time. Thereafter, the BS may receive a UE capability response that includes capability information indicating, for example, the one or more factors. In other cases, the BS may receive an unsolicited capability report from the UE including capability information indicating the one or more factors. Additionally, in some cases, the BS may configure the TCI state application time based on one or more rules in a wireless communications standard.

Thereafter, as shown at block 508, the UE 104 and the BS 102 use the at least one common multi-channel TCI state to communicate with each other based on the configured application time.

TCI State Application Time Considerations

As noted above, aspects of the present disclosure provide techniques for configuring a TCI state application time for at least one common multi-channel TCI state. For example, the UE may receive a TCI state indication from the BS. In some cases, the TCI state indication may be received from the BS via downlink control information (DCI). In some cases, the TCI state indication may comprise at least one common multi-channel TCI state (e.g., such as TCI state types 4-6, described above). Additionally, in some cases, the TCI state indication may also include a separate TCI state type (e.g., such as TCI state types 1-3, described above). Further, the UE and BS may determine and configure a TCI state application time for the at least one common multi-channel TCI state. In some cases, the TCI state application time may be based on one or more factors, as described below.

For example, in some cases, the one or more factors comprise a target channel or target reference signal (RS) associated with the TCI state indication or to which the TCI state indication is applied. In some cases, the TCI state application time may be based on a type of the target channel and/or RS or whether the target channel and/or RS is uplink or downlink. A target signal may refer to a signal for which channel properties may be inferred by measuring those channel properties for an associated source signal. As noted above, a UE may use the source RS to determine various channel properties, depending on the associated QCL type, and use those various channel properties (determined based on the source RS) to process the target signal. Examples of source RSs include phase tracking reference signals (PTRSs), synchronization signal blocks (SSBs), sounding reference signal (SRS), and/or CSI-RSs (e.g., CSI-RS for beam management).

In some cases, the target signal may comprise a target channel, including, for example, a UE-specific or non-UE specific PDCCH, PDSCH, PUCCH, and/or PUSCH. In some cases, the PDSCH/PUCCH/PUSCH target channels may be dynamically scheduled by DCI, semi-statically activated by DCI or MAC-CE, or semi-statically configured by radio resource control (RRC) signaling (e.g., in an RRC information element (IE)). Further, in some cases, the PDSCH target channel may be subject to a case where a scheduling offset between DCI and the PDSCH is equal to or greater than a beam switch latency threshold and/or a case where the scheduling offset is less than the threshold. Additionally, in some cases, it may be assumed that the PDCCH target channel may be carried by all or a subset of control resource sets (CORESETs).

Additionally, in some cases, the target signal may include a synchronization signal block (SSB), periodic, semi-periodic, or aperiodic (P/SP/AP) channel state reference signals (CSI-RSs), and/or P/SP/AP positioning reference signals (PRS). In some cases, the purpose of the CSI-RSs may be for CSI measurement and reporting without the higher layer parameter tracking reference signal (TRS)-Info and repetition, beam measurement and reporting with the higher layer parameter repetition, and TRS measurement with the higher layer parameter TRS-Info. In some cases, the higher layer parameter TRS-Info defines a time frequency resource allocation pattern for a tracking reference signal, which may be a special kind of CSI-RS.

Further, in some cases, the target signal may include P/SP/AP sounding reference signals (SRSs). In some cases, the purpose of the SRSs may be for antenna switching, beam management, codebook based PUSCH, and non-codebook based PUSCH. Additionally, it should be noted that the PUCCH, SSB, CSI-RS, PRS, and/or SRS may be all or a subset of corresponding configured resources associated with the UE.

In some cases, the one or more factors for configuring the TCI state application time may also include a type of cell from which a source channel or reference signal associated with TCI state indication is received (e.g., or to which the TCI state indication is applied). For example, in some cases, the TCI state application time may be based on whether the source RS is received from a serving cell of the UE or a non-serving cell of the UE.

Additionally, in some cases, the one or more factors may include a type of the source reference signal, such as whether the source reference signal is a downlink reference signal or an uplink reference signal. Further, the types of source RSs may include, for example, an SSB, a CSI-RS, a PRS, and an SRS.

Additionally, in some cases, the one or more factors for configuring the TCI state application time may also include an antenna panel via which the TCI state indication was received from the network as well as a panel through which a target channel or target reference signal associated with the TCI state indication is to be received or transmitted. For example, the TCI state application time may depend on whether the DCI or MAC-CE carrying TCI state indication is received by the same antenna panel as that for the transmission or reception of the target channel or target reference signal associated with the TCI state indication. Additionally, in some cases, the TCI state application time may depend on whether an acknowledgement for the DCI or MAC-CE carrying the TCI state indication is transmitted by the same antenna panel as that for the transmission or reception of the target channel or target reference signal associated with the TCI state indication.

In some cases, the one or more factors for configuring the TCI state application time may include a capability of the UE. In some cases, the capability of the UE defines the TCI state application time. According to aspects, when based on a UE capability, a value of the TCI state application time may not be less than a value supported by the UE capability. In some cases, TCI state application time and corresponding UE capability may be scenario dependent or can be scenario independent (e.g., a single value may apply regardless the scenario). For example, in some cases, a value of the TCI state application time may be the same as that reported by UE capability (e.g., regardless of the scenario).

In some cases, a value of the TCI state application time may be configured by the BS while satisfying UE capability. In other words, the BS of the network may configure the TCI state application time based on the capability of the user equipment. In some cases, the BS may configure the TCI state application time based on the UE capability such that there is a sufficiently long application time during which the BS can retransmit the DCI if an acknowledgement for the DCI is not detected. Otherwise, if the application time is too short for the BS to retransmit the DCI, both the BS and UE may have misaligned beams for the same CORESET, and the BS may not be able to communicate with the UE via that CORESET any longer.

Figure 6A:
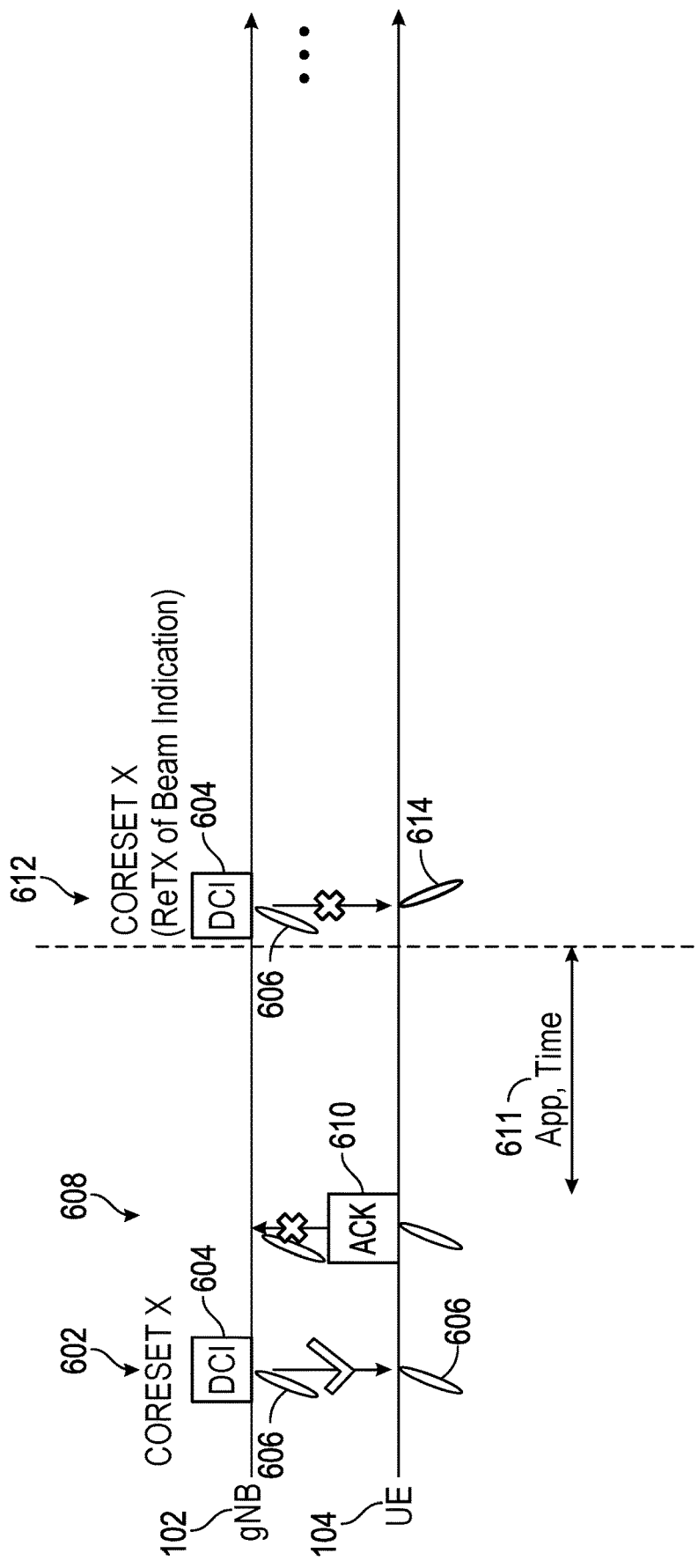
FIG. 6A illustrates one issue caused by an insufficient TCI state application time, in accordance with certain aspects of the present disclosure.

An example of this misalignment is illustrated in FIG. 6A. For example, as shown at 602, the BS 102 (e.g., gNB) may transmit a DCI 604 to the UE using CORESET X on a first beam set 606. In some cases, the DCI 604 may include a TCI state indication.

In response to the DCI 604, the UE 104 may generate and transmit at 608 an acknowledgement 610 to the received DCI 604.

However, as shown, in some cases, the BS 102 may not receive the acknowledgement 610 and therefore does not know whether the UE 104 has correctly received the DCI 604 including the TCI state indication. Accordingly, in such cases, if the TCI state application time 611 is too short, there might not be enough time for the BS 102 to retransmit the DCI 604 before the UE 104 applies the TCI state indication in the DCI 604 received at 602. Therefore, when the BS 102 proceeds to retransmit at 612 the DCI 604 to the UE 104 using CORESET X on the first beam set 606, the UE may already by operating according to a different CORESET and/or different beam set 614, leading to a misalignment of beams and the base station no longer being able to communicate with the UE 104.

Figure 6B:
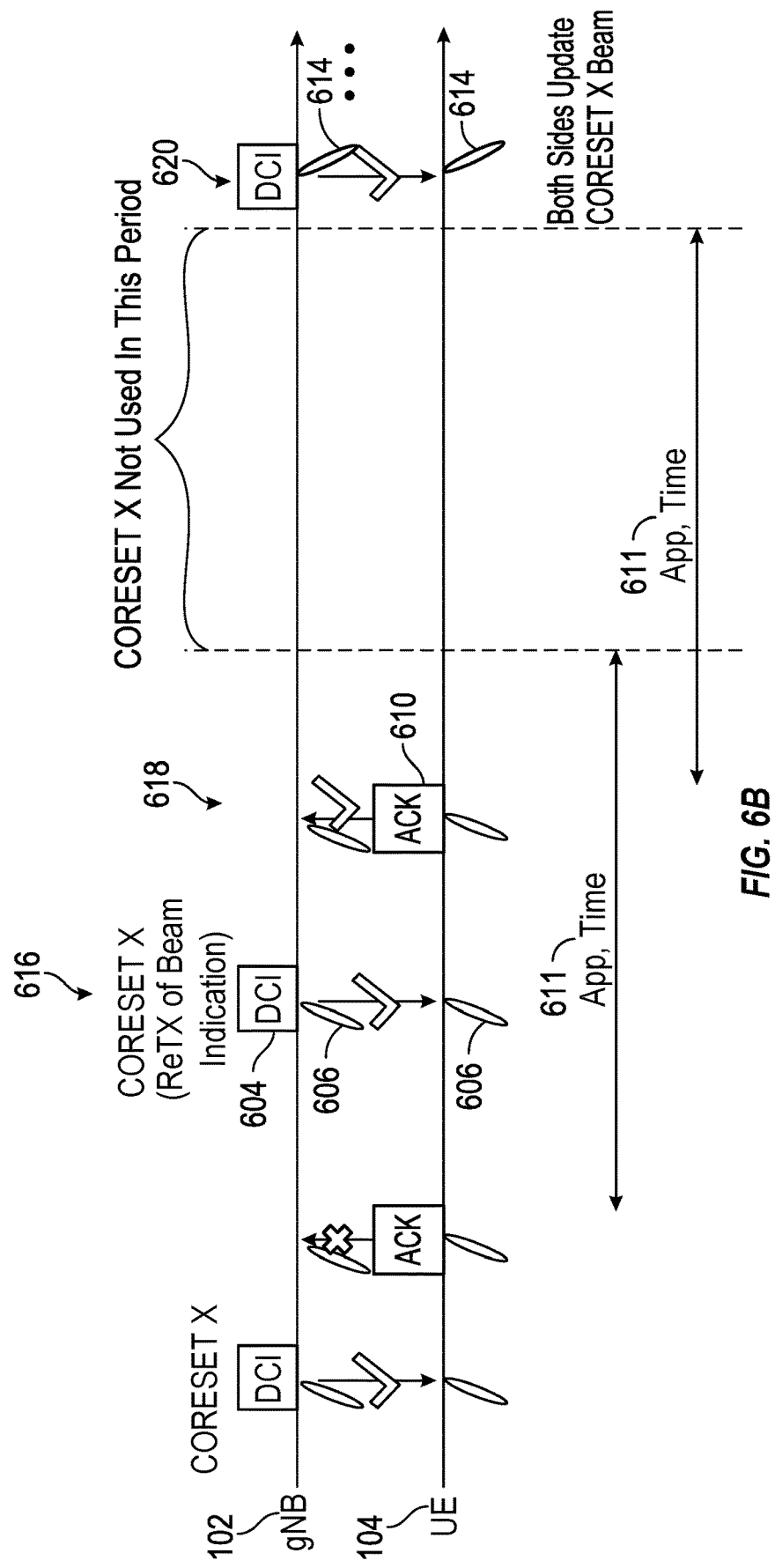
FIG. 6B illustrates one solution to the issues caused by an insufficient TCI state application time, in accordance with certain aspects of the present disclosure

Accordingly, to help address this issue presented in FIG. 6A, the TCI state application time may be configured to be sufficiently long so that the BS 102 can retransmit the DCI at least once via the same CORESET. For example, as illustrated in FIG. 6B, the TCI state application time 611 may be configured to be sufficiently long to allow the BS 102 to retransmit the DCI 604 as shown at 616 such that the UE 104 is able to receive the DCI 604 using the same CORESET X and same first beam set 606. In other words, because the TCI state application time 611 is sufficiently long, the UE 104 may stay on the same first beam set 606 and CORESET X, allowing the BS 102 to retransmit the DCI 604 without any beam misalignment.

Thereafter, once the UE 104 has received the retransmitted DCI 604, the UE 104 may then transmit another acknowledgement 610, which may be received by the BS 102. For reliability, BS 102 may start to use the CORESET X with the different beam set 614 after the end of the TCI state application time 611 counted from the end of successfully received acknowledgement 610 for retransmitted DCI 604. In other words, as shown at 620, the BS 102 and UE 104 may migrate to using the different beam set 614 to communicate after the TCI state application time 611 counted from the end of successfully received acknowledgement 610 for retransmitted DCI 604.

In some cases, the TCI state application time may be determined by a fixed rule while satisfying UE capability. For example, in some cases, the network (e.g., BS 102) may configure the TCI state application time based on a comparison of the capability of the UE and a reference value. The network may then configure the TCI state application time based on a maximum of the reference value and a value associated with the capability of the UE. For example, TCI state application time configured by the network may be the maximum of the reference value and a value reported as a UE capability. In some case, the reference value may be chosen such that the TCI state application time is sufficient for all BSs to retransmit DCI. Thus, the final determined TCI state application time may be sufficient for both BS retransmission of DCI and the UE capability associated with executing the TCI state indication carried in DCI.

Additionally, in some cases, the one or more factors for configuring the TCI state application time may also include a numerology (e.g., sub-carrier spacing) of the TCI state indication and/or of the target channel or target reference signal associated with the TCI state indication. For example, in some cases, the TCI state application time may be configured as a number of symbols per slot based on one of the sub-carrier spacing of the TCI state indication or the sub-carrier spacing of the target reference signal or target channel. For example, in some cases, the TCI state application time may be X symbols or slots in terms of one of the sub-carrier spacing of the TCI state indication or the sub-carrier spacing of the target reference signal or target channel.

In other cases, the TCI state application time may be configured as a number of symbols per slot based on both the sub-carrier spacing of the TCI state indication and the sub-carrier spacing of the target reference signal or channel. For example, the TCI state application time may be X symbols in terms of the largest/smallest numerology of the sub-carrier spacing of the TCI state indication and the sub-carrier spacing of the target reference signal or channel. In some cases, if the sub-carrier spacing of the TCI state indication is larger than the sub-carrier spacing of the target channel or target reference signal, the TCI state application time may be based on the sub-carrier spacing of the TCI state indication. In other cases, if the sub-carrier spacing of the target channel or target reference signal is larger than the sub-carrier spacing of the TCI state indication, the TCI state application time may be based on the sub-carrier spacing of the target channel or reference signal reference signal.

Alternatively, if the sub-carrier spacing of the TCI state indication is smaller than the sub-carrier spacing of the target channel or target reference signal, the TCI state application time may be based on the sub-carrier spacing of the TCI state indication. Additionally, in some cases, if the sub-carrier spacing of the target channel or target reference signal is smaller than the sub-carrier spacing of the TCI state indication, the TCI state application time may be based on the sub-carrier spacing of the target channel or target reference signal.

In some cases, the application time may be configured as (X+Y) symbols or slots in terms of the sub-carrier spacing of the target reference signal. More specifically, the TCI state application time may be based a first component value (e.g., X) and a second component value (e.g. Y). In some cases, the first component value (e.g., X) may be based on at least one of a capability of the user equipment, a network configuration, or a predetermined value (e.g., within a wireless communications standard).

In some cases, the second component value (e.g., Y) may be based on a comparison of the sub-carrier spacing of the TCI state indication and the sub-carrier spacing of the target reference signal. For example, the second component value may be selected to match the duration of "d" symbols or slots in terms of the sub-carrier spacing (e.g., numerology) of the TCI state indication if the sub-carrier spacing of the TCI state indication is less than the sub-carrier spacing of the target reference signal. Otherwise, the second component value may be zero. In other words, the second component value may be either a number of symbols per slot of the TCI state indication based on the sub-carrier spacing of the TCI state indication if the sub-carrier spacing of the TCI state indication is less than the sub-carrier spacing of the target reference signal or zero if the sub-carrier spacing of the TCI state indication is no less than the sub-carrier spacing of the target reference signal. For example, in some cases, the TCI state application time may be configured/determined according to:

$$\text{TCI state Application Time} = \begin{cases} X + d * \frac{2^{\mu_{Applied}}}{2^{\mu_{DCI}}}, & \mu_{DCI} < \mu_{Applied} \\ X, & \mu_{DCI} \geq \mu_{Applied} \end{cases}$$

where $\mu_{DCI}$ is the sub-carrier spacing of the TCI state indication (e.g., sub-carrier spacing of the DCI carrying the TCI state indication), $\mu_{Applied}$ is the sub-carrier spacing of the target channel or target reference signal (e.g., to which the TCI state indication is applied), and d depends on the sub-carrier spacing of the TCI state indication. For example, in some cases, d=8, 8, 14 if $\mu_{DCI}$=0, 1, 2.

According to aspects, in some cases, in case of a single DCI including a TCI state indication that simultaneously updates beam indication(s) on multiple CCs, the TCI state application time may be a common value for all CCs or a subset of CCs and for all target channels and target RSs those CCs. For example, the TCI state indication may be configured to update beam indications on a plurality of component carriers. In some cases, the TCI state application time is configured to be the same for the plurality of component carriers. In some cases, the TCI state application time may be configured for only a subset of the plurality of component carriers.

According to aspects, in the case of a common TCI state application time, in some cases, the beam indication(s) may include a common TCI state indication to be applied to all indicated CCs. Further, in some cases, the common TCI state application time may a TCI state application time determined based on the sub-carrier spacing of the TCI state indication or on the sub-carrier spacing of the target channel or target reference signal. For example, assume the DCI carrying the TCI state indication is on bandwidth part (BWP) #1 in CC #1 with SCS=60 kHz, while the target channel(s) or target reference signal(s) to which the TCI state indication is applied is on BWP #1 in CC #1 with SCS=60 kHz and on BWP #2 in CC #2 with SCS=120 kHz.

In this case, two individual TCI state application times may be determined for the two SCS pairs of 60+60 and 60+120. Thereafter, the common TCI state application time may be chosen as the maximum of the two individual application time per applied CC, or a network (or BS) configured value no less than either individual application time.

In some cases, the TCI state indication may be configured to update beam indications on a single CC. For example, the TCI state indication in the DCI may only indicate a single applied BWP+CC. In some cases, the indication of the single applied BWP+CC may be indicated in a carrier indication field (CIF). In other cases, the indication of the single applied BWP+CC may be an implicit indication. For example, in some cases, the CC used to receive the DCI is assumed to be the CC to apply the updated beam indications.

In some cases, if the single CC belongs to a radio resource control (RRC) configured CC list, the TCI state indication (and beam indication) carried by the DCI may be applied to all CCs in that list. For example, when the single component carrier is associated with a RRC component carrier list, the UE and/or the BS may update all component carriers in the RRC component carrier list based on the TCI state indication.

According to aspects, as noted above, the TCI state indication may apply to a common beam for a downlink channel and/or RS and an uplink channel and/or RS. In such cases, a single common TCI state application time or two separate common TCI state application times may be introduced for the DL and UL channel(s) and/or RS(s), respectively. In other words, in some cases, the TCI state application time may be configured for one of the downlink channel reference signal or the uplink channel reference signal and the UE/BS may configure another TCI state application time for the other of the downlink channel reference signal or the uplink channel reference signal. Additionally, in some cases, the TCI state indication may apply to a common beam for at least two downlink channel (s) and/or RS(s) or to a common beam for at least two uplink channel(s) and/or RS(s).

In some cases, the TCI state application time may start at different starting locations and may be configured as a number of milliseconds, a number of symbols, or a number of slots. For example, in some cases, the TCI state application time may start at an end of a slot containing the DCI or MAC-CE carrying the TCI state indication or from the end of the DCI or MAC-CEDCI or MAC-CE carrying the beam indication. In other words, the UE/BS may start the TCI state application time at an end of a slot carrying the TCI state indication or at an end of the DCI or MAC-CE carrying the TCI state indication. In such cases, the TCI state indication may represent the time in X ms or Y slots/symbols starting from either the end of the slot carrying the TCI indication or the end of the DCI or MAC-CE carrying the TCI state information to application of the TCI state indication (e.g., when the UE/BS begins communicating using the TCI state indication).

In other cases, the TCI state application time may start from the end of slot containing the acknowledgement for the DCI or MAC-CE carrying the TCI state indication or from the end of acknowledgement for the DCI or MAC-CE carrying the TCI state indication. For example, in some cases, the UE may send an acknowledgement of the TCI state indication to the network. Thereafter, the UE and BS may start the TCI state application time at an end of a slot carrying the acknowledgement or may start the TCI state application time at an end of the acknowledgement. In some cases, if an existing DL DCI format (e.g., DCI format 1_0, 1_1, 1_2) is used for the TCI state indication and the existing DL DCI format schedules DL reception (Rx), the acknowledgement may be the acknowledgement for the scheduled DL Rx (e.g., PDSCH) In some cases, if an existing UL DCI format (e.g., DCI format 0_0, 0_1, 0_2) is used for the TCI state indication and schedules an UL transmission (Tx), the acknowledgement can be the scheduled UL Tx (e.g. PUSCH, SRS). In some cases, if an existing or a new DCI format is used for the beam indication without any scheduled Tx, the acknowledgement can be a dedicated acknowledgement bit for the DCI, which can be carried in PUCCH/PUSCH.

In some cases, as noted above, the TCI state indication may comprise a common multi-channel TCI state that may apply to a common beam for a downlink channel and/or RS and uplink channel and/or RS (e.g., TCI state type 4), for at least two downlink channel(s) and/or RS(s) (e.g., TCI state type 5), or for at least two uplink channels or reference signals (e.g., TCI state type 6). In such cases, when a common multi-channel TCI state is signaled in a DCI and is to be applied to multiple channel(s) and/or RS(s) and different subsets of channel(s) and/or RS(s) have their own beam indication application time, a final TCI state application time may be a single value determined in one or more different manners. Note, in some cases, the application time per subset of channel(s) and/or RS(s) can be reported as a UE capability or determined in in a wireless communications standard as fixed value.

For example, in some cases, the final TCI state application time may be a largest value among individual TCI state application times for different subsets of channel(s) and/or RS(s) applicable to the common multi-channel TCI state. In other words, in some cases, the TCI state application time may be determined as the maximum channel-specific TCI state application time associated with a plurality of channels associated with a common beam. For example, if the TCI state application time is 28/20/36 symbols for PDSCH/PUCCH/PUSCH, respectively, the final TCI state application time may be determined to be 36 symbols for a joint DL/UL common beam TCI state applicable to these 3 types of channels.

In other cases, the final TCI state application time may be configured by the network/base station while satisfying the largest TCI state application time among the individual TCI state application times for the different subsets of channel(s) and/or RS(s). In other words, in some cases, the TCI state application time is determined by the network and is at least as long as the maximum channel-specific TCI state application time associated with a plurality of channels associated with the common beam. For example, in some cases, the network/base station configures a final TCI state application time to be at least 36 symbols in the example above, where the configured application time can be chosen such that it is sufficient for the network/base station to retransmit DCI.

In other cases, the final TCI state application time may be determined by a fixed rule while satisfying the largest TCI state application time among the individual TCI state application times for the different subsets of channel(s) and/or RS(s). In other words, in some cases, the TCI state application time is determined by a rule and is at least as long as the maximum channel-specific TCI state application time associated with a plurality of channels associated with the common beam. For example, in some cases, the final TCI state application time may be the maximum of a fixed value and the largest value of the individual TCI state application times, where the fixed value can be chosen such that it is sufficient for all BSs to retransmit DCI.

Example Wireless Communication Devices

Figure 7:
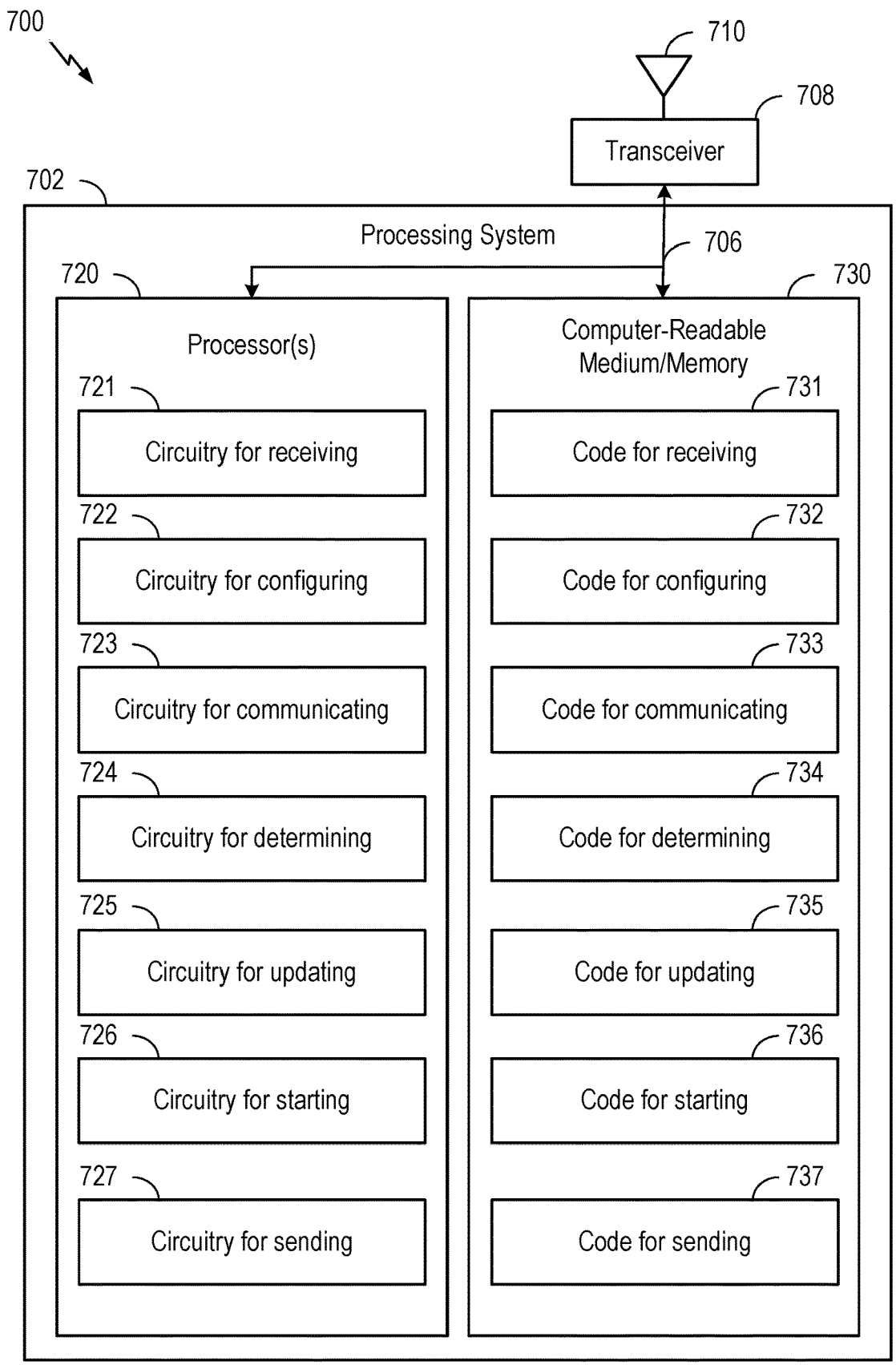
FIG. 7 illustrates an example wireless communications device configured to perform operations for the methods disclosed herein, in accordance with certain aspects of the present disclosure.

FIG. 7 depicts an example communications device 700 that includes various components operable, configured, or adapted to perform operations for the techniques disclosed herein, such as the operations depicted and described with respect to FIGS. 4A and 5. In some examples, communications device 700 may be a UE 104 as described, for example with respect to FIGS. 1 and 2.

Communications device 700 includes a processing system 702 coupled to a transceiver 708 (e.g., a transmitter and/or a receiver). Transceiver 708 is configured to transmit (or send) and receive signals for the communications device 700 via an antenna 710, such as the various signals as described herein. Processing system 702 may be configured to perform processing functions for communications device 700, including processing signals received and/or to be transmitted by communications device 700.

Processing system 702 includes one or more processors 720 coupled to a computer-readable medium/memory 730 via a bus 706. In certain aspects, computer-readable medium/memory 730 is configured to store instructions (e.g., computer-executable code) that when executed by the one or more processors 720, cause the one or more processors 720 to perform the operations illustrated in FIGS. 4A and 5, or other operations for performing the various techniques discussed herein for configuring a TCI state application time for at least one common multi-channel TCI state.

In the depicted example, computer-readable medium/memory 730 stores code 731 for receiving, code 732 for configuring, code 733 for communicating, code 734 for determining, code 735 for updating, code 736 for starting, and code 737 for sending.

In the depicted example, the one or more processors 720 include circuitry configured to implement the code stored in the computer-readable medium/memory 730, including circuitry 721 for receiving, circuitry 722 for configuring, circuitry 723 for communicating, circuitry 724 for determining, circuitry 725 for updating, circuitry 726 for starting, and code 727 for sending.

Various components of communications device 700 may provide means for performing the methods described herein, including with respect to FIGS. 4A and 5.

In some examples, means for transmitting or sending (or means for outputting for transmission) and/or means for communicating may include the transceivers 254 and/or antenna(s) 252 of the UE 104 illustrated in FIG. 2 and/or transceiver 708 and antenna 710 of the communications device 700 in FIG. 7.

In some examples, means for receiving (or means for obtaining) may include the transceivers 254 and/or antenna(s) 252 of the UE 104 illustrated in FIG. 2 and/or transceiver 708 and antenna 710 of the communications device 700 in FIG. 7.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for determining, means for configuring, means for updating, and means for starting may include various processing system components, such as: the one or more processors 720 in FIG. 7, or aspects of the UE 104 depicted in FIG. 2, including receive processor 258, transmit processor 264, TX MIMO processor 266, and/or controller/processor 280 (including TCI state application time component 281).

Notably, FIG. 7 is an example, and many other examples and configurations of communications device 700 are possible.

Figure 8:
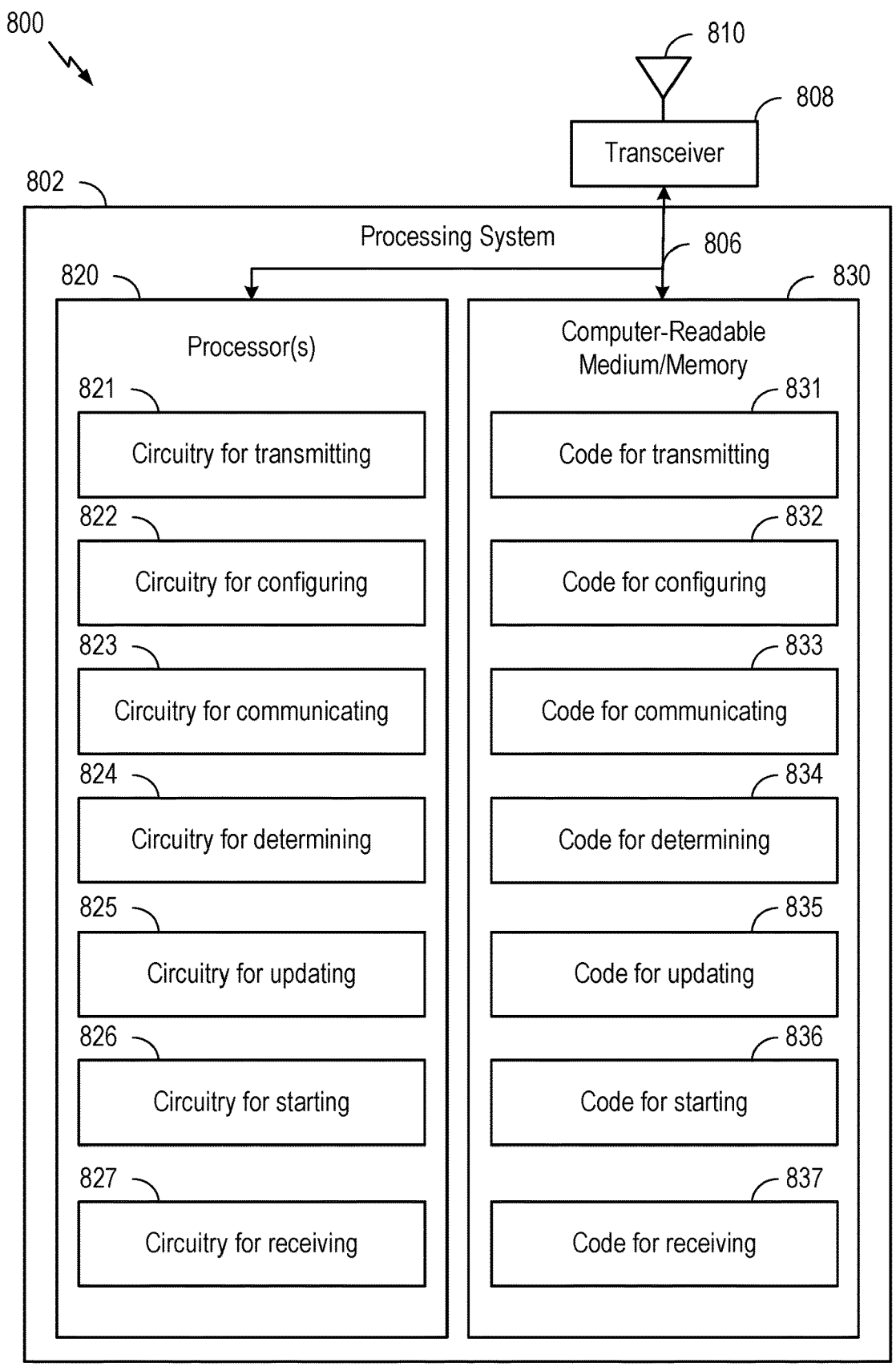
FIG. 8 illustrates an example wireless communications device configured to perform operations for the methods disclosed herein, in accordance with certain aspects of the present disclosure.

FIG. 8 depicts an example communications device 800 that includes various components operable, configured, or adapted to perform operations for the techniques disclosed herein, such as the operations depicted and described with respect to FIGS. 4B and 5. In some examples, communications device 800 may be a BS 102 as described, for example with respect to FIGS. 1 and 2.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 830 via a bus 806. In certain aspects, computer-readable medium/memory 830 is configured to store instructions (e.g., computer-executable code) that when executed by the one or more processors 820, cause the one or more processors 820 to perform the operations illustrated in FIGS. 4B and 5, or other operations for performing the various techniques discussed herein for configuring a TCI state application time for at least one common multi-channel TCI state.

In the depicted example, computer-readable medium/memory 830 stores code 831 for transmitting, code 832 for configuring, code 833 for communicating, code 834 for determining, code 835 for updating, code 836 for starting, and code 837 for receiving.

In the depicted example, the one or more processors 820 include circuitry configured to implement the code stored in the computer-readable medium/memory 830, including circuitry 821 for transmitting, circuitry 822 for configuring, circuitry 823 for communicating, circuitry 824 for determining, circuitry 825 for updating, circuitry 826 for starting, and circuitry 827 for receiving.

Various components of communications device 800 may provide means for performing the methods described herein, including with respect to FIGS. 4B and 5.

In some examples, means for transmitting or sending (or means for outputting for transmission) may include the transceivers 232 and/or antenna(s) 234 of the BS 102 illustrated in FIG. 2 and/or transceiver 808 and antenna 810 of the communications device 800 in FIG. 8.

In some examples, means for receiving (or means for obtaining) may include the transceivers 232 and/or antenna (s) 234 of the base station illustrated in FIG. 2 and/or transceiver 808 and antenna 810 of the communications device 800 in FIG. 8.

In some examples, means for determining, means for configuring, means for updating, and means for starting may include various processing system components, such as: the one or more processors 820 in FIG. 8, or aspects of the BS 102 depicted in FIG. 2, including receive processor 238, transmit processor 220, TX MIMO processor 230, and/or controller/processor 240 (including TCI state application time component 241).

Notably, FIG. 8 is an example, and many other examples and configurations of communications device 800 are possible.

Example Clauses

Implementation examples are described in the following numbered clauses:

Clause 1: A method for wireless communications at a user equipment, comprising: receiving a transmission configuration indicator (TCI) state indication from a network, wherein the TCI state indication comprises at least one common multi-channel TCI state; and configuring a TCI state application time for the at least one common multi-channel TCI state based on one or more factors.

Clause 2: The method of Clause 1, wherein the one or more factors comprise at least one of: a type of target channel or target reference signal associated with the TCI state indication; a type of cell from which a source reference signal associated with the TCI state indication is received; a type of a source reference signal associated with the TCI state indication; a panel through which the TCI state indication was received from the network; a panel through which a target channel or target reference signal associated with the TCI state indication is to be received or transmitted; a number of component carriers used for the TCI state indication; a sub-carrier spacing of the TCI state indication; a sub-carrier spacing of a target channel or target reference signal associated with the TCI state indication; or a capability of the user equipment.

Clause 3: The method of Clause 2, wherein the one or more factors comprise the type of the source reference signal associated with the TCI state indication, and wherein the type of the source reference signal comprises one of: a synchronization signal block (SSB); a channel state information-reference signal (CSI-RS); a positioning reference signal (PRS); or a sounding reference signal (SRS).

Clause 4: The method of any one of Clauses 2-3, wherein the TCI state application time is configured as a number of symbols per slot based on one of the sub-carrier spacing of the TCI state indication or the sub-carrier spacing of the target channel or target reference signal.

Clause 5: The method of any one of Clauses 2-3, wherein the TCI state application time is configured as a number of symbols per slot based on both the sub-carrier spacing of the TCI state indication and the sub-carrier spacing of the target channel or target reference signal.

Clause 6: The method of Clause 5, if the sub-carrier spacing of the TCI state indication is larger than the sub-carrier spacing of the target channel or target reference signal, the TCI state application time is based on the sub-carrier spacing of the TCI state indication, and wherein if the sub-carrier spacing of the target channel or target reference signal is larger than the sub-carrier spacing of the TCI state indication, the TCI state application time is based on the sub-carrier spacing of the target channel or reference signal reference signal.

Clause 7: The method of Clause 5, if the sub-carrier spacing of the TCI state indication is smaller than the sub-carrier spacing of the target channel or target reference signal, the TCI state application time is based on the sub-carrier spacing of the TCI state indication, and wherein if the sub-carrier spacing of the target channel or target reference signal is smaller than the sub-carrier spacing of the TCI state indication, the TCI state application time is based on the sub-carrier spacing of the target channel or target reference signal.

Clause 8: The method of Clause 5, wherein the TCI state application time is based on: a first component value, based on one of: a capability of the user equipment; a network configuration; or a predetermined value; and a second component value, based on a comparison of the sub-carrier spacing of the TCI state indication and the sub-carrier spacing of the target reference signal.

Clause 9: The method of Clause 8, wherein the second component value is: a number of symbols per slot of the TCI state indication based on the sub-carrier spacing of the TCI state indication if the sub-carrier spacing of the TCI state indication is less than the sub-carrier spacing of the target reference signal; or zero if the sub-carrier spacing of the TCI state indication is no less than the sub-carrier spacing of the target reference signal.

Clause 10: The method of any one of Clauses 1-9, wherein the TCI state indication is configured to update beam indications on a plurality of component carriers.

Clause 11: The method of Clause 10, wherein the TCI state application time is configured to be the same for the plurality of component carriers.

Clause 12: The method of Clause 11, further comprising: determining a first TCI state application time associated with the TCI state indication, wherein the first TCI state application time is based on a sub-carrier spacing associated with the TCI state indication; determining a second TCI state application time associated with a target channel or target reference signal associated with the TCI state indication, wherein the second TCI state application time is based on a sub-carrier spacing associated with the target channel or target reference signal associated with the TCI state indication.

Clause 13: The method of Clause 12, wherein configuring a TCI state application time for the at least one common multi-channel TCI state comprises selecting one of: a maximum of either the first TCI state application time or the second TCI state application time per component carrier in the plurality of component carriers; or a network configured TCI state application time with a value not less than either of the first TCI state application time or the second TCI state application time.

Clause 14: The method of Clause 10, wherein the TCI state application time is configured for only a subset of the plurality of component carriers.

Clause 15: The method of Clause 1, wherein the TCI state indication is configured to update beam indications on a single component carrier.

Clause 16: The method of Clause 15, wherein: the single component carrier is associated with a radio resource control (RRC) component carrier list, and the method further comprises updating all component carriers in the RRC component carrier list based on the TCI state indication.

Clause 17: The method of any one of Clauses 1-16, further comprising starting the TCI state application time at an end of a slot carrying the TCI state indication.

Clause 18: The method of any one of Clauses 1-16, further comprising starting the TCI state application time at an end of downlink control information or a medium access control-control element (MAC-CE) carrying the TCI state indication.

Clause 19: The method of any one of Clauses 1-16, further comprising: sending an acknowledgement of the TCI state indication to the network; and starting the TCI state application time at an end of a slot carrying the acknowledgement.

Clause 20: The method of any one of Clauses 1-16, further comprising: sending an acknowledgement of the TCI state indication to the network; and starting the TCI state application time at an end of the acknowledgement.

Clause 21: The method of any one of Clauses 17-20, wherein the TCI state application time is configured as one of: a number of milliseconds; a number of symbols; or a number of slots.

Clause 22: The method of any one of Clauses 19-20, wherein the acknowledgement comprises a dedicated acknowledgement bit carried on one of a physical uplink control channel (PUCCH) or a physical uplink shared channel (PUSCH).

Clause 23: The method of any one of Clauses 1-22, wherein the TCI state indication comprises a common beam TCI state indication.

Clause 24: The method of Clause 23, wherein the TCI state indication applies to a common beam for a downlink channel or reference signal and an uplink channel or reference signal.

Clause 25: The method of Clause 24, wherein: the TCI state application time is configured for one of the downlink channel or reference signal or the uplink channel or reference signal, and the method further comprises configuring another TCI state application time for the other of the downlink channel or reference signal or the uplink channel or reference signal.

Clause 26: The method of Clause 23, wherein the TCI state indication applies to a common beam for at least two downlink channels or reference signals.

Clause 27: The method of Clause 23, wherein the TCI state indication applies to a common beam for at least two uplink channels or reference signals.

Clause 28: The method of any one of Clauses 23-25, wherein the TCI state application time is determined as the maximum channel-specific TCI state application time associated with a plurality of channels associated with the common beam.

Clause 29: The method of any one of Clauses 23-27, wherein the TCI state application time is determined by the network and is at least as long as the maximum channel-specific TCI state application time associated with a plurality of channels associated with the common beam.

Clause 30: The method of any one of Clauses 23-27, wherein the TCI state application time is determined by a rule and is at least as long as the maximum channel-specific TCI state application time associated with a plurality of channels associated with the common beam.

Clause 31: The method of any one of Clauses 1-30, wherein the TCI state indication is received via downlink control information (DCI).

Clause 32: The method of any one of Clauses 1-30, wherein the type of the target channel is one of a physical downlink shared channel (PDSCH), a physical downlink control channel (PDCCH), a physical uplink control channel (PUCCH), or a physical uplink shared channel (PUSCH).

Clause 33: The method of Clause 2, wherein the TCI state application time is based on the capability of the user equipment.

Clause 34: The method of Clause 33, wherein the capability of the user equipment defines the TCI state application time.

Clause 35: The method of Clause 33, wherein the network configures the TCI state application time based on the capability of the user equipment.

Clause 36: The method of Clause 33, wherein the network configures the TCI state application time based on a comparison of the capability of the user equipment and a reference value.

Clause 37: The method of Clause 36, wherein the network configures the TCI state application time based on a maximum of the reference value and a value associated with the capability of the user equipment.

Clause 38: A method for wireless communications at a base station, comprising: transmitting a transmission configuration indicator (TCI) state indication to a user equipment (UE), wherein the TCI state indication comprises at least one common multi-channel TCI state; and configuring a TCI state application time for the at least one common multi-channel TCI state based on one or more factors.

Clause 39: The method of clause 38, wherein the one or more factors comprise at least one of: a type of target channel or target reference signal associated with the TCI state indication; a type of cell from which a source reference signal associated with the TCI state indication is received; a type of a source reference signal associated with the TCI state indication; a panel through which the TCI state indication was received from the network; a panel through which a target channel or target reference signal associated with the TCI state indication is to be received or transmitted; a number of component carriers used for the TCI state indication; a sub-carrier spacing of the TCI state indication; a sub-carrier spacing of a target channel or target reference signal associated with the TCI state indication; or a capability of the user equipment.

Clause 40: The method of Clause 39, wherein the one or more factors comprise the type of the source reference signal associated with the TCI state indication, and wherein the type of the source reference signal comprises one of: a synchronization signal block (SSB); a channel state information-reference signal (CSI-RS); a positioning reference signal (PRS); or a sounding reference signal (SRS).

Clause 41: The method of any one of Clauses 39-40, wherein the TCI state application time is configured as a number of symbols per slot based on one of the sub-carrier spacing of the TCI state indication or the sub-carrier spacing of the target channel or target reference signal.

Clause 42: The method of any one of Clauses 39-40, wherein the TCI state application time is configured as a number of symbols per slot based on both the sub-carrier spacing of the TCI state indication and the sub-carrier spacing of the target channel or target reference signal.

Clause 43: The method of Clause 42, if the sub-carrier spacing of the TCI state indication is larger than the sub-carrier spacing of the target channel or target reference signal, the TCI state application time is based on the sub-carrier spacing of the TCI state indication, and wherein if the sub-carrier spacing of the target channel or target reference signal is larger than the sub-carrier spacing of the TCI state indication, the TCI state application time is based on the sub-carrier spacing of the target channel or reference signal reference signal.

Clause 44: The method of Clause 42, if the sub-carrier spacing of the TCI state indication is smaller than the sub-carrier spacing of the target channel or target reference signal, the TCI state application time is based on the sub-carrier spacing of the TCI state indication, and wherein if the sub-carrier spacing of the target channel or target reference signal is smaller than the sub-carrier spacing of the TCI state indication, the TCI state application time is based on the sub-carrier spacing of the target channel or target reference signal.

Clause 45: The method of Clause 42, wherein the TCI state application time is based on: a first component value, based on one of: a capability of the user equipment; a network configuration; or a predetermined value; and a second component value, based on a comparison of the sub-carrier spacing of the TCI state indication and the sub-carrier spacing of the target reference signal.

Clause 46: The method of Clause 45, wherein the second component value is: a number of symbols per slot of the TCI state indication based on the sub-carrier spacing of the TCI state indication if the sub-carrier spacing of the TCI state indication is less than the sub-carrier spacing of the target reference signal; or zero if the sub-carrier spacing of the TCI state indication is no less than the sub-carrier spacing of the target reference signal.

Clause 47: The method of any one of Clauses 38-46, wherein the TCI state indication is configured to update beam indications on a plurality of component carriers.

Clause 48: The method of Clause 47, wherein the TCI state application time is configured to be the same for the plurality of component carriers.

Clause 49: The method of Clause 48, further comprising: determining a first TCI state application time associated with the TCI state indication, wherein the first TCI state application time is based on a sub-carrier spacing associated with the TCI state indication; determining a second TCI state application time associated with a target channel or target reference signal associated with the TCI state indication, wherein the second TCI state application time is based on a sub-carrier spacing associated with the target channel or target reference signal associated with the TCI state indication.

Clause 50: The method of Clause 49, wherein configuring a TCI state application time for the at least one common multi-channel TCI state comprises selecting one of: a maximum of either the first TCI state application time or the second TCI state application time per component carrier in the plurality of component carriers; or a network configured TCI state application time with a value not less than either of the first TCI state application time or the second TCI state application time.

Clause 51: The method of Clause 47, wherein the TCI state application time is configured for only a subset of the plurality of component carriers.

Clause 52: The method of Clause 38, wherein the TCI state indication is configured to update beam indications on a single component carrier.

Clause 53: The method of Clause 52, wherein: the single component carrier is associated with a radio resource control (RRC) component carrier list, and the method further comprises updating all component carriers in the RRC component carrier list based on the TCI state indication.

Clause 54: The method of any one of Clauses 38-53, further comprising starting the TCI state application time at an end of a slot carrying the TCI state indication.

Clause 55: The method of any one of Clauses 38-53, further comprising starting the TCI state application time at an end of downlink control information or a medium access control-control element (MAC-CE) carrying the TCI state indication.

Clause 56: The method of any one of Clauses 38-53, further comprising: receiving an acknowledgement of the TCI state indication from the UE; and starting the TCI state application time at an end of a slot carrying the acknowledgement.

Clause 57: The method of any one of Clauses 38-53, further comprising: receiving an acknowledgement of the TCI state indication from the UE; and starting the TCI state application time at an end of the acknowledgement.

Clause 58: The method of Clause any one of Clauses 54-57, wherein the TCI state application time is configured as one of: a number of milliseconds; a number of symbols; or a number of slots.

Clause 59: The method of any one of Clauses 56-57, wherein the acknowledgement comprises a dedicated acknowledgement bit carried on one of a physical uplink control channel (PUCCH) or a physical uplink shared channel (PUSCH).

Clause 60: The method of any one of Clauses 38-59, wherein the TCI state indication comprises a common beam TCI state indication.

Clause 61: The method of Clause 60, wherein the TCI state indication applies to a common beam for a downlink channel or reference signal and an uplink channel or reference signal.

Clause 62: The method of Clause 61, wherein: the TCI state application time is configured for one of the downlink channel or reference signal or the uplink channel or reference signal, and the method further comprises configuring another TCI state application time for the other of the downlink channel or reference signal or the uplink channel or reference signal.

Clause 63: The method of Clause 60, wherein the TCI state indication applies to a common beam for at least two downlink channels or reference signals.

Clause 64: The method of Clause 60, wherein the TCI state indication applies to a common beam for at least two uplink channels or reference signals.

Clause 65: The method of any one of Clauses 60-64, wherein the TCI state application time is determined as a maximum channel-specific TCI state application time associated with a plurality of channels associated with the common beam.

Clause 66: The method of any one of Clauses 60-64, wherein the TCI state application time is determined by the network and is at least as long as a maximum channel-specific TCI state application time associated with a plurality of channels associated with the common beam.

Clause 67: The method of any one of Clauses 60-64, wherein the TCI state application time is determined by a rule and is at least as long as a maximum channel-specific TCI state application time associated with a plurality of channels associated with the common beam.

Clause 68: The method of any one of Clauses 38-67, wherein the TCI state indication is received via downlink control information (DCI).

Clause 69: The method of any one of Clauses 38-67, wherein the type of the target channel is one of a physical downlink shared channel (PDSCH), a physical downlink control channel (PDCCH), a physical uplink control channel (PUCCH), or a physical uplink shared channel (PUSCH).

Clause 70: The method of Clause 39, wherein the TCI state application time is based on the capability of the user equipment.

Clause 71: The method of Clause 70, wherein the capability of the user equipment defines the TCI state application time.

Clause 72: The method of Clause 70, wherein the network configures the TCI state application time based on the capability of the user equipment.

Clause 73: The method of Clause 70, wherein the network configures the TCI state application time based on a comparison of the capability of the user equipment and a reference value.

Clause 74: The method of Clause 73, wherein the network configures the TCI state application time based on a maximum of the reference value and a value associated with the capability of the user equipment.

Clause 75: An apparatus, comprising: a memory comprising computer-executable instructions; one or more processors configured to execute the computer-executable instructions and cause the one or more processors to perform a method in accordance with any one of Clauses 1-74.

Clause 76: An apparatus, comprising means for performing a method in accordance with any one of Clauses 1-74.

Clause 77: A non-transitory computer-readable medium comprising computer-executable instructions that, when executed by one or more processors, cause the one or more processors to perform a method in accordance with any one of Clauses 1-74.

Clause 78: A computer program product embodied on a computer-readable storage medium comprising code for performing a method in accordance with any one of Clauses 1-74.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mmWave or near mmWave frequencies, the BS 180 may be referred to as an mmWave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of configuring a TCI state application time for at least one common multi-channel TCI state in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to at least one of a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f)

unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method for wireless communications at a user equipment, comprising:
    receiving a transmission configuration indicator (TCI) state indication from a network, wherein the TCI state indication comprises at least one common multi-channel TCI state; and
    configuring a TCI state application time for the at least one common multi-channel TCI state, wherein the TCI state application time is configured as a number of symbols per slot based on a sub-carrier spacing of a target channel or target reference signal associated with the TCI state indication.

2. The method of claim 1, wherein the TCI state application time is based on at least one of:
    a type of target channel or target reference signal associated with the TCI state indication;
    a type of cell from which a source reference signal associated with the TCI state indication is received;
    a type of a source reference signal associated with the TCI state indication;
    a panel through which the TCI state indication was received from the network;
    a panel through which a target channel or target reference signal associated with the TCI state indication is to be received or transmitted;
    a number of component carriers used for the TCI state indication;
    a sub-carrier spacing of the TCI state indication;
    the sub-carrier spacing of a target channel or target reference signal associated with the TCI state indication; or
    a capability of the user equipment.

3. The method of claim 2, wherein the TCI state application time is based on the type of the source reference signal, and wherein the type of the source reference signal associated with the TCI state indication comprises one of:
    a synchronization signal block (SSB);
    a channel state information-reference signal (CSI-RS)
    a positioning reference signal (PRS); or
    a sounding reference signal (SRS).

4. The method of claim 2, wherein the TCI state application time is configured as a number of symbols per slot based on both the sub-carrier spacing of the TCI state indication and the sub-carrier spacing of the target channel or target reference signal.

5. The method of claim 4, wherein:
    if the sub-carrier spacing of the TCI state indication is larger than the sub-carrier spacing of the target channel or target reference signal, the TCI state application time is based on the sub-carrier spacing of the TCI state indication, and
    if the sub-carrier spacing of the target channel or target reference signal is larger than the sub-carrier spacing of the TCI state indication, the TCI state application time is based on the sub-carrier spacing of the target channel or reference signal reference signal.

6. The method of claim 4, wherein:
    if the sub-carrier spacing of the TCI state indication is smaller than the sub-carrier spacing of the target channel or target reference signal, the TCI state application time is based on the sub-carrier spacing of the TCI state indication, and
    if the sub-carrier spacing of the target channel or target reference signal is smaller than the sub-carrier spacing of the TCI state indication, the TCI state application time is based on the sub-carrier spacing of the target channel or target reference signal.

7. The method of claim 4, wherein:
    the TCI state application time is based on a first component value and a second component value,
    the first component value is based on one of:
        a capability of the user equipment,
        a network configuration, or
        a predetermined value,
    the second component value is based on a comparison of the sub-carrier spacing of the TCI state indication and the sub-carrier spacing of the target reference signal, and
    the second component value is:
        a number of symbols per slot of the TCI state indication based on the sub-carrier spacing of the TCI state indication if the sub-carrier spacing of the TCI state indication is less than the sub-carrier spacing of the target reference signal; or
        zero if the sub-carrier spacing of the TCI state indication is not less than the sub-carrier spacing of the target reference signal.

8. The method of claim 2, wherein the type of the target channel is one of a physical downlink shared channel (PDSCH), a physical downlink control channel (PDCCH), a physical uplink control channel (PUCCH), or a physical uplink shared channel (PUSCH).

9. The method of claim 2, wherein:
    the TCI state application time is based on the capability of the user equipment, and at least one of:
        the capability of the user equipment defines the TCI state application time,
        the network configures the TCI state application time based on the capability of the user equipment, or
        the network configures the TCI state application time based on:
            a comparison of the capability of the user equipment and a reference value, and
            a maximum of the reference value and a value associated with the capability of the user equipment.

10. The method of claim 1, wherein the TCI state indication is configured to update beam indications on a plurality of component carriers.

11. The method of claim 10, wherein:
    the TCI state application time is configured to be the same for the plurality of component carriers,
    the method further comprises:
        determining a first TCI state application time associated with the TCI state indication, wherein the first TCI state application time is based on a sub-carrier spacing associated with the TCI state indication; and
        determining a second TCI state application time associated with a target channel or target reference signal associated with the TCI state indication, wherein the second TCI state application time is based on the sub-carrier spacing of the target channel or target reference signal associated with the TCI state indication, and the configuring the TCI state application time for the at least one common multi-channel TCI state comprises selecting one of:
a maximum of either the first TCI state application time or the second TCI state application time per component carrier in the plurality of component carriers; or
a network configured TCI state application time with a value not less than either of the first TCI state application time or the second TCI state application time.

12. The method of claim 10, wherein the TCI state application time is configured for only a subset of the plurality of component carriers.

13. The method of claim 1, wherein:
the TCI state indication is configured to update beam indications on a single component carrier,
the single component carrier is associated with a radio resource control (RRC) component carrier list, and
the method further comprises updating all component carriers in the RRC component carrier list based on the TCI state indication.

14. The method of claim 1, further comprising starting the TCI state application time at an end of a slot carrying the TCI state indication.

15. The method of claim 1, further comprising starting the TCI state application time at an end of downlink control information or a medium access control-control element (MAC-CE) carrying the TCI state indication.

16. The method of claim 1, further comprising:
sending an acknowledgement of the TCI state indication to the network; and
starting the TCI state application time at an end of a slot carrying the acknowledgement.

17. The method of claim 1, further comprising:
sending an acknowledgement of the TCI state indication to the network; and
starting the TCI state application time at an end of the acknowledgement.

18. The method of claim 17, wherein the TCI state application time is configured as one of:
a number of milliseconds;
a number of symbols; or
a number of slots.

19. The method of claim 17, wherein the acknowledgement comprises a dedicated acknowledgement bit carried on one of a physical uplink control channel (PUCCH) or a physical uplink shared channel (PUSCH).

20. The method of claim 1, wherein the TCI state indication comprises a common beam TCI state indication.

21. The method of claim 20, wherein:
the TCI state indication applies to a common beam for a downlink channel or reference signal and an uplink channel or reference signal,
the TCI state application time is configured for one of the downlink channel or reference signal or the uplink channel or reference signal, and
the method further comprises configuring another TCI state application time for the other of the downlink channel or reference signal or the uplink channel or reference signal.

22. The method of claim 20, wherein the TCI state indication applies to a common beam for at least two downlink channels or reference signals.

23. The method of claim 20, wherein the TCI state indication applies to a common beam for at least two uplink channels or reference signals.

24. The method of claim 20, wherein one of:
the TCI state application time is determined as a maximum channel-specific TCI state application time associated with a plurality of channels associated with the common beam;
the TCI state application time is determined by the network and is at least as long as a maximum channel-specific TCI state application time associated with a plurality of channels associated with the common beam; or
the TCI state application time is determined by a rule and is at least as long as a maximum channel-specific TCI state application time associated with a plurality of channels associated with the common beam.

25. The method of claim 1, wherein the TCI state indication is received via downlink control information (DCI).

26. An apparatus, comprising:
at least one memory comprising executable instructions; and
one or more processors configured to execute the executable instructions and cause the apparatus to:
receive a transmission configuration indicator (TCI) state indication from a network, wherein the TCI state indication comprises at least one common multi-channel TCI state; and
configure a TCI state application time for the at least one common multi-channel TCI state, wherein the one or more processors are configured to cause the apparatus to configure the TCI state application time as a number of symbols per slot based on a sub-carrier spacing of a target channel or target reference signal associated with the TCI state indication.

27. A non-transitory computer-readable medium, comprising:
executable instructions that, when executed by one or more processors of an apparatus, cause the apparatus to:
receive a transmission configuration indicator (TCI) state indication from a network, wherein the TCI state indication comprises at least one common multi-channel TCI state; and
configure a TCI state application time for the at least one common multi-channel TCI state, wherein the instructions cause the apparatus to configure the TCI state application time as a number of symbols per slot based on a sub-carrier spacing of a target channel or target reference signal associated with the TCI state indication.

28. The apparatus of claim 26, wherein the one or more processors are further configured to cause the apparatus to:
send an acknowledgement of the TCI state indication to the network; and
start the TCI state application time at an end of the acknowledgement.

29. The method of claim 28, wherein the TCI state application time is configured as one of:
a number of milliseconds;
a number of symbols; or
a number of slots.

30. The method of claim 28, wherein the acknowledgement comprises a dedicated acknowledgement bit carried on one of a physical uplink control channel (PUCCH) or a physical uplink shared channel (PUSCH).

* * * * *